J. A. Seaman,
Croning Stares.
Nº 26,206.   Patented Nov. 22, 1859.
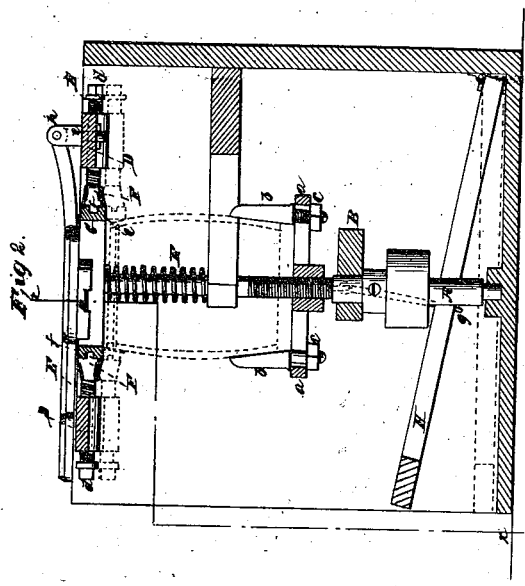
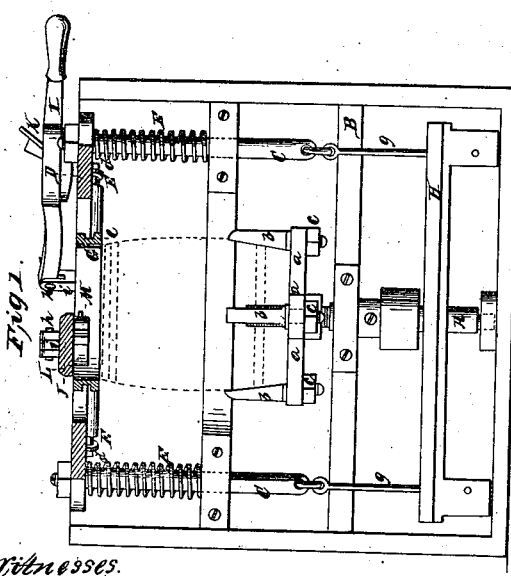
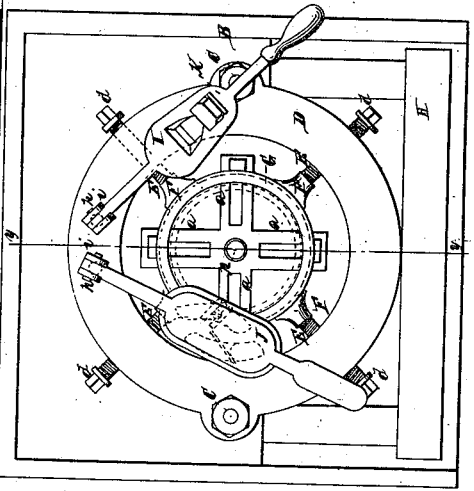
Witnesses.
Louis Huffell
George M. Doggett
Inventor.
John. A. Seaman

UNITED STATES PATENT OFFICE.

JOHN A. SEAMAN, OF ST. LOUIS, MISSOURI.

MACHINE FOR CHAMFERING AND CROZING KEGS OR CASKS.

Specification of Letters Patent No. 26,206, dated November 22, 1859.

*To all whom it may concern:*

Be it known that I, JOHN A. SEAMAN, of St. Louis, in the county of St. Louis and State of Missouri, have invented a new and Improved Machine to be Used in the Manufacture of Kegs; and I do hereby declare that the following is a full, clear, and exact description of the same, reference being had to the annexed drawings, making a part of this specification, in which—

Figure 1, is a front sectional view of my invention. Fig. 2, is a side sectional view of ditto. Fig. 3, is a plan or top view of ditto.

Similar letters of reference indicate corresponding parts in the several figures.

The object of this invention is to obtain a machine whereby kegs may be howeled, crozed, the chimes formed complete ready to receive the heads, and the work performed very expeditiously, in a perfect manner and with but the aid of a single attendant or operator.

To enable those skilled in the art to fully understand and construct my invention I will proceed to describe it.

A, represents a vertical arbor which is placed within a suitable framing B. The arbor A, is allowed to rotate freely in its bearings and on its upper end horizontal radial arms $a$, are placed, said arms rotating with the arbor. The arms $a$, are slotted longitudinally and each arm has a vertical jaw $b$, fitted in it and secured therein by a nut $c$, on its lower end, see Figs. 1 and 2. The jaws $b$, it will be seen may be adjusted nearer to or farther from the center of the arbor A, by unscrewing and screwing up the nuts $c$.

C, C, are two vertical shafts or arbors which are allowed to slide freely in the framing B, and have an annular plate D, attached to their upper ends. On the upper parts of the shafts C, C, there are placed springs E, E, one on each shaft. These springs sustain the annular plate D, as clearly shown in Fig. 1. In the plate D, radial screws E, are fitted or placed. These screws have each a square $d$, formed on their outer ends and the inner ends of the screws are fitted in guides F, which sustain a ring G, said ring having a groove $e$, made circumferentially in its outer surface to receive projections $f$, on the guides F, as shown clearly in Fig. 2. By adjusting the screws E, it will be seen that the ring G, may be made concentric with the circle in which the jaws $b$, are placed. The lower ends of the shafts C, C, are connected by links $g$, $g$, to a treadle-frame H.

On the upper part of the plate D, there are two levers I, J. These levers are secured by pivots in standards $i$, which are fitted loosely in the plate so that they may turn therein. In the lever I, a plane K, is fitted and a howel L, and crozing tool M, are fitted in lever J.

The operation of the machine is as follows: The keg to be operated on, shown in red, is placed over the arms $a$, and is secured concentric with the arbor A, between the jaws $b$. The ring G, is then adjusted concentric with the keg by turning the screws E. The arbor A, is then rotated by any convenient power and the ring G, by depressing the treadle-frame H, is made to descend and fit over the upper end of the keg, the ring G, rotating with the keg. The operator then grasps the lever I, and applies the planer K, to the top of the keg the planer finishing or beveling the top edges of the staves. The lever I, is then shoved aside to the right and made to rest on plate D, and the lever J, grasped by the operator and the howel L, applied to the keg so as to smooth and finish the inner sides of the staves, the lever J, being pressed to the left in order to effect this result. The lever J, is then pressed to the right and the tool M, cuts the croze. The operator then removes his foot from the treadle-frame H, the springs E, elevate the plate D, and ring G, the keg is removed from the arms $a$, inverted and again adjusted to the arms to have its other end treated in the same manner as the one described. Rings G, of different dimensions may be used according to the size of the kegs to be operated on.

The machine it will be seen may be used for working on barrels and all forms of casks whether large or small, and the kegs, barrels, or casks, may, when operated on, be secured or bound by truss-hoops, although in certain cases the head hoops of a barrel, keg or cask may be removed and the same operated on and finished without applying truss-hoops.

Having thus described my invention what I claim as new and desire to secure by Letters Patent, is,

The rotating arms $a$ provided with the adjustable jaws b, the adjustable rotating ring G, fitted to the annular plate D, by the screws and guides E, F, the plate D, being provided with the tool-holding levers I, J, attached to the guide shafts C, and supported by the springs E, and the shafts C, connected to a treadle-frame H, the whole being combined and arranged to operate substantially as and for the purpose set forth.

JOHN A. SEAMAN.

Witnesses:
SAML. CUPPLES,
CHAS. P. THOMPSON.